(12) United States Patent
Zöller

(10) Patent No.: US 7,073,478 B2
(45) Date of Patent: Jul. 11, 2006

(54) INTERNAL COMBUSTION ENGINE WITH AUTO-IGNITION

(75) Inventor: Herbert Zöller, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/156,618

(22) Filed: Jun. 20, 2005

(65) Prior Publication Data

US 2005/0229897 A1    Oct. 20, 2005

Related U.S. Application Data

(63) Continuation-in-part of application No. PCT/EP03/12872, filed on Nov. 18, 2003.

(30) Foreign Application Priority Data

Dec. 20, 2002   (DE)   ................. 102 61 181

(51) Int. Cl.
*F02F 3/26*   (2006.01)
*F02F 3/28*   (2006.01)
(52) U.S. Cl. ................. 123/276; 123/279; 123/298
(58) Field of Classification Search ........ 123/261–263, 123/276–280, 298, 305, 661, 193.5, 193.4
See application file for complete search history.

(56) References Cited

U.S. PATENT DOCUMENTS

| | | | | |
|---|---|---|---|---|
| 2,076,030 A | * | 4/1937 | Kahllenberger | ............. 123/275 |
| 2,505,999 A | * | 5/1950 | Smith | ............. 123/262 |
| 3,583,373 A | * | 6/1971 | Hardenberg | ............. 123/279 |
| 4,549,508 A | * | 10/1985 | Fujimoto | ............. 123/73 PP |
| 5,029,563 A | * | 7/1991 | Hu | ............. 123/262 |
| 5,067,457 A | * | 11/1991 | Shinzawa | ............. 123/269 |
| 5,555,869 A | | 9/1996 | Uchida | |
| 6,382,179 B1 | | 5/2002 | Hansson | |

FOREIGN PATENT DOCUMENTS

| | | |
|---|---|---|
| DE | 40 33 822 | 6/1991 |
| DE | 40 33 822 | 6/1995 |
| EP | 0 294 092 | 12/1988 |
| EP | 0 485 610 | 5/1992 |
| FR | 2 723 763 | 2/1996 |
| JP | 01 267351 | 10/1989 |
| JP | 10 141 063 | 5/1998 |

* cited by examiner

*Primary Examiner*—Mahmoud Gimie
(74) *Attorney, Agent, or Firm*—Klaus J. Bach

(57) ABSTRACT

In an internal combustion engine with auto-ignition in which the fuel is injected directly into the combustion chamber by means of a fuel injection nozzle in the form of multiple fuel jets, wetting of the combustion chamber-side cylinder head surface is minimized by recesses formed in the cylinder head whereby some of the fuel is reflected by the piston towards the cylinder head when the piston is in a position adjacent the cylinder head and directed at least partially into the recesses formed in the cylinder head.

7 Claims, 3 Drawing Sheets

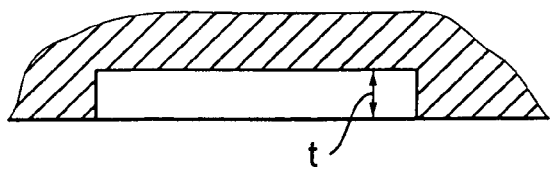
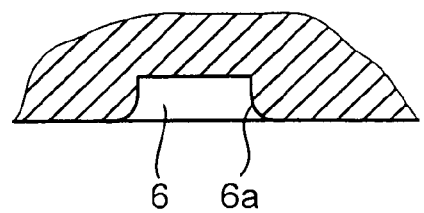
Fig. 3a                Fig. 3b
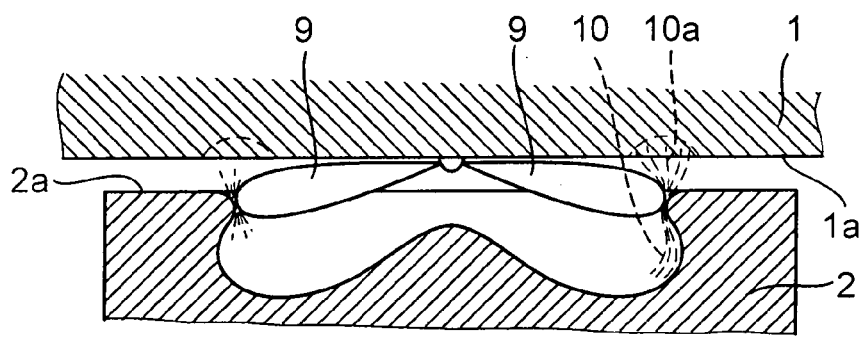
Fig. 4
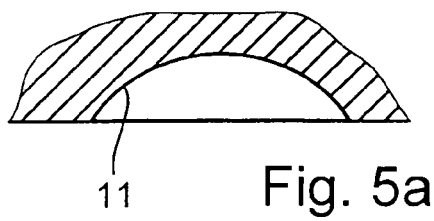
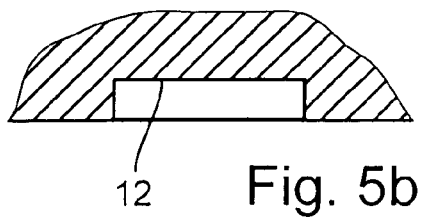
Fig. 5a                Fig. 5b
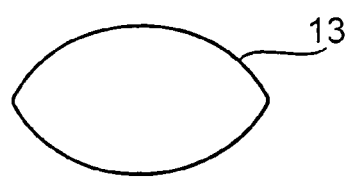
Fig. 5c                Fig. 5d

INTERNAL COMBUSTION ENGINE WITH AUTO-IGNITION

This is a Continuation-In-Part Application of International Application PCT/EP2003/012872 filed Nov. 18, 2003 and claiming the priority of German application 102 61 181.5 filed Dec. 20, 2002.

BACKGROUND OF THE INVENTION

The invention relates to an internal combustion engine with direct fuel injection having a combustion chamber defined by a cylinder head and a piston having a trough and a fuel injection device mounted in the cylinder head for injecting fuel into the combustion chamber so that at least some of the fuel strikes the piston trough.

In modern internal combustion engines having auto-ignition and direct fuel injection, fuel in the form of multiple fuel jets is injected directly into the combustion chamber by means of an injection nozzle in such a way that the fuel strikes the piston head and is then dispersed in the combustion chamber. In order to optimize the combustion, a piston trough, which has an influence on the dispersion of the fuel in the combustion chamber, is nowadays provided in the piston head. This serves to improve the mixing of the fuel introduced in the combustion chamber with the combustion air.

DE 40 33 822 C2 discloses a diesel engine having direct fuel injection, with a piston which has a trough, wherein a recess is provided in the trough wall in order to detach the fuel as rapidly as possible from the trough wall in the peripheral direction of the trough. Despite the optimized piston trough, the reflected fuel in the combustion chamber is deflected towards the cylinder head, so that the formation of emissions and soot particles still remains high.

It is the object of the present invention to provide an internal combustion engine with direct fuel injection wherein atomization of the fuel in the combustion chamber of the internal combustion engine is improved.

SUMMARY OF THE INVENTION

In an internal combustion engine with auto-ignition in which the fuel is injected directly into the combustion chamber by means of a fuel injection nozzle in the form of multiple fuel jets, wetting of the combustion chamber-side cylinder head surface is minimized by recesses formed in the cylinder head whereby some of the fuel is reflected by the piston towards the cylinder head when the piston is in a position adjacent the cylinder head and directed at least partially into the recesses formed in the cylinder head.

This minimizes any fuel wetting of the combustion chamber-side cylinder head surface during combustion, thereby reducing particulate emissions.

In an embodiment of the internal combustion engine according to the invention the recess is arranged on the combustion chamber-side cylinder head surface in such a way that at least some of the fuel introduced into the combustion chamber is reflected by the piston trough towards the cylinder head and is at least partially deflected towards the recess. During the atomization of the fuel in the combustion chamber this ensures that if at least some of the fuel is reflected towards the cylinder head by the piston trough and/or a piston head when the piston is in a position during a compression and/or expansion stroke, the deflected fuel at least partially enters the recess arranged in the cylinder head. This results in optimum homogenization of the reflected fuel.

According to a particular embodiment of the invention, at least one recess is arranged on the combustion chamber-side cylinder head surface above a trough edge area of the piston trough. Since the fuel fractions reflected from the piston trough edge area are predominantly deflected towards the cylinder head or atomized by a trough edge area, it is very advantageous to provide the recess in that area of the cylinder head, to which the fuel fractions are deflected. The recess is preferably arranged in such a way that a center line of the recess coincides with a center line of the piston trough edge. Deflecting the reflected fuel into the interior of the recesses serves to further augment the atomization of the deflected fuel fractions when the fuel is injected into the combustion chamber in the form of multiple fuel jets.

In an other embodiment of the internal combustion engine according to the invention, multiple recesses are arranged on the combustion chamber-side cylinder head surface. When using a multi-hole nozzle forming multiple jets, multiple recesses are provided in order to permit optimum homogenization of the fuel fractions reflected towards the cylinder head. The recesses are arranged in such a way that the deflected fuel fractions from each jet at least partially pass into at least one of the recesses. These fuel fractions are thereby mixed, atomized and vaporized more intensively with combustion air, so that they can take part in the combustion without significant formation of soot particles.

In cross-section, the shape of the recess preferably takes the form of a part of a circle and/or of an ellipse, although the recess in cross-section may also or alternatively take the form of a part of a polygon. At the same time the recess preferably has a depth of between 1 and 10 millimeters.

Further features and combinations of features will become apparent from the following description of exemplary embodiments of the invention on the basis of the accompanying drawings:

BRIEF DESCRIPTION OF THE DRAWINGS

FIG. 3a shows a section along the section line A-A according to FIG. 2, FIG. 3b shows a section along the section line B-B according to FIG. 2, FIG. 4 shows schematically combustion chamber cross-section of an internal combustion engine having auto-ignition and direct fuel injection, FIGS. 5a–5b show cross-sections of various forms of the recesses according to the invention, FIGS. 5c–5d show plan views of various forms of the recesses according to the invention.

DESCRIPTION OF EXEMPLARY EMBODIMENTS

Figure 1:
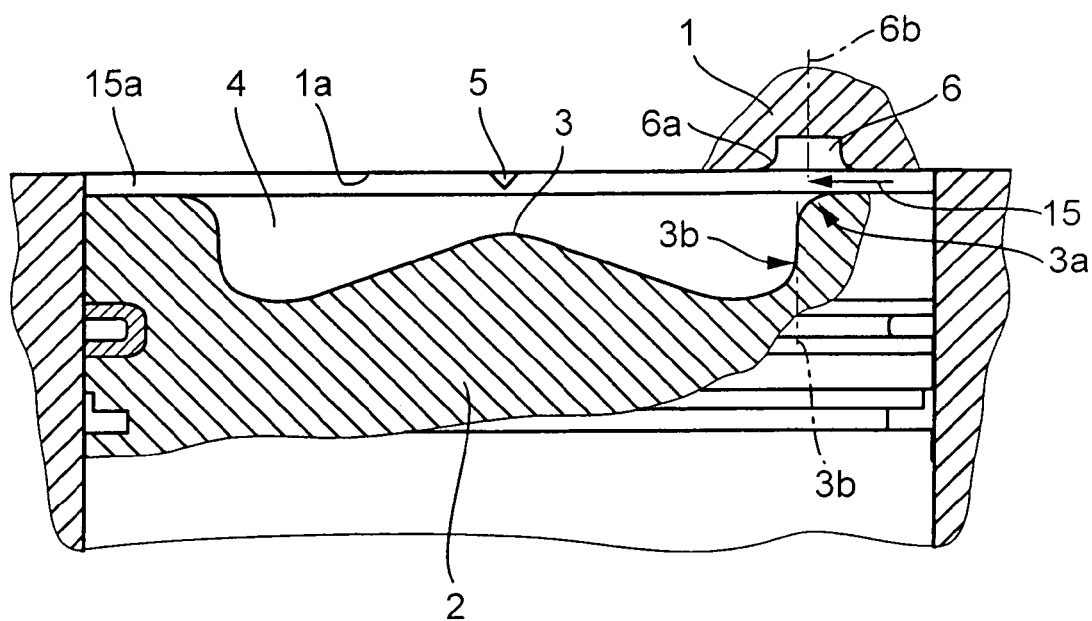
FIG. 1 shows a combustion chamber cross-section of an internal combustion engine having auto-ignition and direct fuel injection.

An internal combustion engine having auto-ignition and direct fuel injection has at least one cylinder, in which a combustion chamber 4 is formed between a piston 2, supported so that it is longitudinally movable in the cylinder relative to and a cylinder head 1.

The internal combustion engine operation is based on the 4-stroke principle. In a first intake stroke combustion air is delivered to the combustion chamber 4 via two inlet valves 8, while the piston 4 moves downward to a bottom dead center position. In a subsequent compression stroke the piston 4 moves upwards whereby the combustion air is compressed and, at the end of the compression stroke, the fuel is injected into the combustion chamber by means of a fuel injection nozzle 5 arranged in the cylinder head 1.

The fuel injection nozzle 5 is a multi-hole injection nozzle, which is preferably arranged centrally in the cylinder head 1. The fuel injection nozzle 5 is actuated by an electronic control unit (not shown) by way of a signal line (not shown) and an actuator, for example a piezo actuator. The piston then moves toward the bottom dead center position in a third (expansion) stroke before the exhaust gases formed during combustion are expelled from the combustion chamber 4 via an exhaust valve 7 in an ensuing fourth (exhaust) stroke.

The fuel injection nozzle 5 injects fuel directly into the combustion chamber 4 in FIG. 1, which is defined by the cylinder head 1 and the piston 2, so that at least some of the fuel strikes the piston trough 3 and/or a piston trough wall 3b. A recess 6 arranged on the combustion chamber-side cylinder head surface 1a serves to ensure that some of the fuel introduced into the combustion chamber and reflected by the piston trough 3 towards the cylinder head 1 is received by the recess 6, so that homogenization of the deflected fuel is assured even before combustion commences. It is therefore advantageous for the recess 6 to be positioned in the cylinder head 1 above a piston area from which the fuel is deflected towards the cylinder head 1. According to the present exemplary embodiment the recess 6 is arranged on the combustion chamber-side cylinder head surface 1a above a trough edge area 3a of the piston trough 3.

Figure 2:
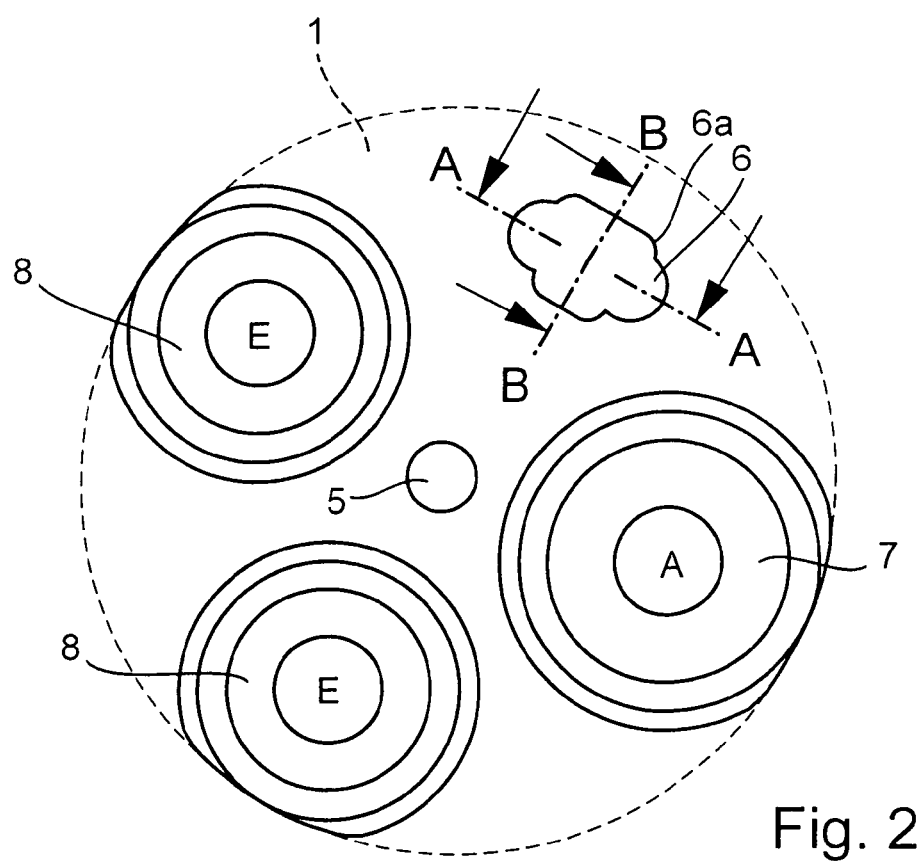
FIG. 2 is a schematic plan view of a combustion chamber-side cylinder head surface of the internal combustion engine according to FIG. 1.

According to FIG. 2, a recess 6 is arranged on the combustion chamber-side cylinder head surface 1a, however multiple recesses are possible. This is particularly advantageous if the fuel injection nozzle 5 takes the form of a multi-hole nozzle. In this case the fuel jets 9 emerging from the injection nozzle according to FIG. 4 strike the deflecting wall of the piston trough 3 when the piston is in a position at the end of the compression stroke, so that some of the deflected fuel 10 mixes with the combustion air inside the piston trough and on the other side is reflected towards the recess 6, with the result that the fuel fractions deflected towards the cylinder head 1 are further homogenized either inside the recess 6 or by swirling created by the recess.

The fuel injection may be timed, or alternatively fuel may be pre-injected during the induction stroke and/or in the compression stroke. Timed pre-injection is likewise feasible. With the mixture formation from a pre-injected fuel quantity obtained in the induction stroke and/or the compression stroke with high air excess, any significant soot formation is avoided since the fuel is finely and extensively dispersed throughout the combustion chamber. In the case of a further main injection the piston trough shape interacting with the recesses provided causes the deflected fuel fractions to be subjected by the piston trough to a further intensive and turbulent mixing inside the recesses. This ensures the homogenization of the fuel fractions reflected towards the cylinder head, so that soot formation in the combustion phase of the main injection is significantly reduced.

In order to intensify the combustion of the fuel-air mixture formed, swirling is provided for the combustion air intake which boosts the atomization and the homogenization of the fuel. As the piston moves upwards towards the cylinder head in the compression stroke the combustion air is compressed by means of a quench gap 15a between an edge area of the piston head, where there is no depression of the piston head 2a, and the cylinder head 1 and simultaneously displaced into the central area of the combustion chamber 4 in such a way that fuel atomization is further intensified. In order not to adversely affect this process through the proposed recess, the transitional areas of the recess 6 are provided in the direction of the squish flow 15 towards a combustion chamber-side cylinder head surface 1a with radii 6a, so that the compressed combustion air displaced towards the center of the combustion chamber 4 can flow unimpeded along the combustion chamber-side cylinder head surface 1a towards the center of the combustion chamber 4.

FIG. 4 shows how the injected fuel jets 9 are partially deflected into the interior of the piston trough 3, some in the form of a first fuel cloud 10, and some reflected towards the cylinder head in the form of a further fuel cloud 10a. In order to extend the path of the fuel fractions reflected towards the cylinder head and consequently to intensify the mixing and/or homogenization of the fuel cloud 10 formed with the combustion air, these fuel fractions are deflected through a trough edge area of the trough wall 3a into the interior of the recess 6 where they are further mixed with combustion air.

Figure 6:
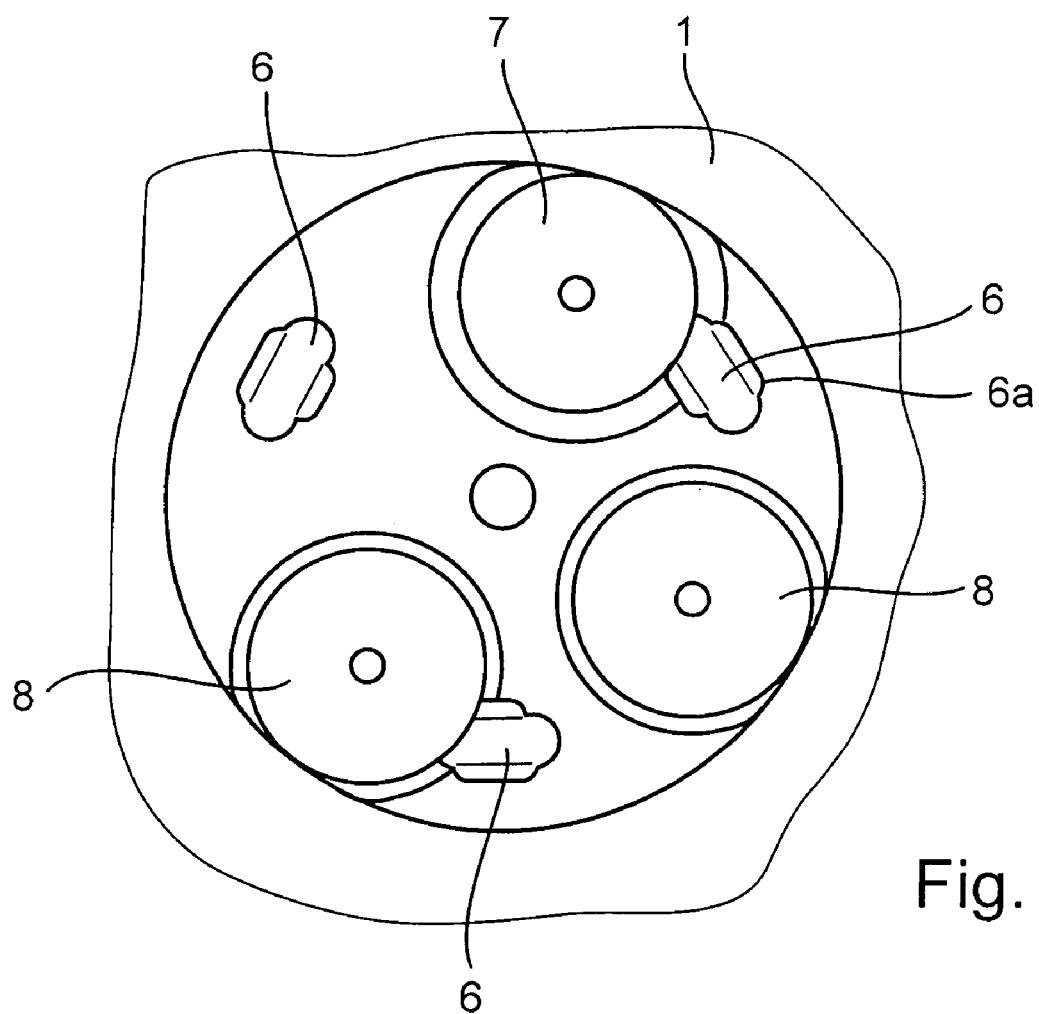
FIG. 6 shows a plan view of a second embodiment of a combustion chamber-side cylinder head surface.

It is advantageous if a center line 6b of the recess 6 coincides with, or at least is not more than five millimeters from, a tangent 3b or an extension line of the piston trough edge 3a. In this way, fewer soot particles are formed during the combustion of the fuel and an optimized combustion with fewer exhaust emissions is generally obtained. If the fuel is introduced into the combustion chamber in the form of multiple fuel jets, it is advantageous to arrange multiple recesses in the cylinder head in accordance with FIG. 6, in such a way that the fuel reflected by the piston 2 towards the cylinder head 1 is at least partially directed into the interior of the recesses 6. The recesses 6 are disposed above the areas from which the fuel is deflected towards the cylinder head 1. The recesses 6 may in this case be situated in direct proximity to the valve seat areas arranged in the cylinder head 1.

According to FIGS. 5a–5d the recesses provided in the cylinder head may have various shapes and different designs. In cross-section the recess may be semi-circular in shape. It is also feasible, however, to design the recesses with a cross-sectional shape in the form of a part of a polygon. In plan view the recesses may be furthermore be of circular shape. Alternatively the recesses may be elliptical in plan view. In plan view the recess may likewise be of polygonal shape. The recess preferably has a maximum depth t of between 1 and 10 millimeters.

The invention in based on an internal combustion engine with auto-ignition, in which the fuel is injected in the form of multiple fuel jets 9 directly into the combustion chamber by means a fuel injection nozzle 5. The wetting of the combustion chamber-side cylinder head surface is minimized by the provision of the recesses. This ensures that some of the fuel reflected by the piston towards the cylinder head when the piston is in a position during a compression and/or expansion stroke at least partially enters the recesses.

It is also feasible to use the aforementioned combustion chamber configuration having the recesses according to the invention in a modified exemplary embodiment for a two-stroke internal combustion having auto-ignition and direct fuel injection.

What is claimed is:

1. An internal combustion engine with auto ignition having a cylinder, with a cylinder head and a piston having a piston trough with a trough edge area, and a combustion chamber defined by the cylinder head and the piston, and a fuel injection device for injecting fuel directly into the combustion chamber, so that at least some of the fuel enters the piston trough, and at least one recess formed in the cylinder head surface above the trough edge area remote from the center of the combustion chamber such that some of the fuel injected into the combustion chamber and the piston trough is deflected from the trough edge area toward the cylinder head and collected in the at least one recess formed in the cylinder head, whereby, in a squish, flow of compressed air forced at the end of the compression stroke of the piston from a circumferential combustion chamber area toward the center of the combustion chamber, turbulence is generated upon passing the at least one recess such that the compressed air in the squish flow is homogeneously mixed with the fuel collected in the at least one recess.

2. The internal combustion engine as claimed in claim 1, wherein multiple recesses are arranged in the cylinder head.

3. The internal combustion engine as claimed in claim 1, wherein, in cross-section, the at least one recess has the shape of a part of a circle or an ellipse.

4. The internal combustion engine as claimed in claim 1, wherein in cross-section, the at least one recess has the shape of a part of a polygon.

5. The internal combustion engine as claimed in claim 1, wherein, in a plan view, the shape of the at least one recess is one of circular and elliptical.

6. The internal combustion engine as claimed in claim 1, wherein in plan view the at least one recess is polygonal.

7. The internal combustion engine as claimed in claim 1, wherein the at least one recess has a depth of between 1 and 10 millimeters.

* * * * *